(12) United States Patent
Deeter et al.

(10) Patent No.: US 9,391,944 B2
(45) Date of Patent: Jul. 12, 2016

(54) SUGGESTING OPT-OUT OF NOTIFICATIONS TO USERS OF A SOCIAL NETWORKING SYSTEM

(71) Applicant: Facebook, Inc., Menlo Park, CA (US)

(72) Inventors: Ken Taro Deeter, San Carlos, CA (US); Wayne Kao, Mountain View, CA (US); Charles Jolley, Los Altos, CA (US); Bo Zhang, San Francisco, CA (US); Andrew Song, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 643 days.

(21) Appl. No.: 13/716,036

(22) Filed: Dec. 14, 2012

(65) Prior Publication Data

US 2014/0172995 A1 Jun. 19, 2014

(51) Int. Cl.
*G06F 15/16* (2006.01)
*H04L 12/58* (2006.01)
*G06Q 50/00* (2012.01)

(52) U.S. Cl.
CPC .............. *H04L 51/32* (2013.01); *H04L 51/12* (2013.01); *H04L 51/24* (2013.01); *G06Q 50/01* (2013.01)

(58) Field of Classification Search
CPC ......... H04L 51/12; H04L 51/24; H04L 51/32; H04L 51/34; H04L 51/38; H04L 63/102; H04L 63/104; H04L 67/02; H04L 67/22; H04L 67/322; H04L 67/306; H04W 4/12; H04W 4/18; H04W 4/206; H06Q 30/02; H06Q 30/0255; H06Q 30/0269; H06Q 50/01; G06F 17/30386
USPC ......... 709/203–207; 705/14.49, 14.53, 14.66, 705/319; 707/616, 661, 784, 758, 752–753; 726/6–7
See application file for complete search history.

(56) References Cited

U.S. PATENT DOCUMENTS

| | | | |
|---|---|---|---|
| 6,618,851 B1* | 9/2003 | Zundel | G06F 17/50 711/156 |
| 8,595,322 B2* | 11/2013 | Vasters | H04N 21/252 705/400 |
| 2008/0082607 A1* | 4/2008 | Sastry | G06Q 10/107 709/204 |
| 2011/0113094 A1* | 5/2011 | Chunilal | G06F 17/30867 709/204 |
| 2012/0041822 A1* | 2/2012 | Landry | G06Q 30/0261 705/14.58 |
| 2012/0094642 A1* | 4/2012 | Popperl | H04M 3/42076 455/415 |
| 2012/0150971 A1* | 6/2012 | Bahrainwala | G06Q 50/01 709/206 |
| 2012/0295645 A1* | 11/2012 | Yariv | H04L 67/322 455/466 |
| 2013/0111356 A1* | 5/2013 | Vasudevan | G06F 3/04817 715/753 |
| 2013/0282504 A1* | 10/2013 | Lessin | G06Q 30/02 705/26.1 |
| 2014/0379795 A1* | 12/2014 | Nakajima | H04L 51/32 709/204 |

* cited by examiner

*Primary Examiner* — Viet Vu
*Assistant Examiner* — Michael A Chambers
(74) *Attorney, Agent, or Firm* — Fenwick & West LLP

(57) ABSTRACT

A social networking system notifies its users of different events and actions taking place inside the social networking system. To present notifications that are most likely to be of interest to the user, the social networking system observes the interactions of the user with notifications presented to the user and suggests an option to opt-out of notifications associated with a source based on the observed interactions. The option to opt-out of notifications associated with the source may be presented if the users interactions with the notifications presented are below a threshold. Notifications associated with a social group are presented to the user based on factors describing the group and the relation between the user and other users of the social group, for example, seniority of the user, size of the group, and the rate at which user actions associated with the group are received.

25 Claims, 6 Drawing Sheets

SUGGESTING OPT-OUT OF NOTIFICATIONS TO USERS OF A SOCIAL NETWORKING SYSTEM

BACKGROUND

This invention relates to sending notifications to a user of a social networking system, and in particular to suggesting opt-out of notifications to users of the social networking system.

Social networking system store social information provided by users including but not limited to hometown, current city, education history, employment history, photos, and events the user participated in the user's profile. Users utilize social networking systems because social networking systems allow users to create connections with friends and interact with each other. Social networking systems allow users to view other user's profile, organize events, and invite friends to participate in those events.

Users spend time in a social networking system viewing other users' profiles, pictures and posts. Oftentimes users find value in using a social networking system because they can obtain information and updates about their friends it would have been otherwise hard to obtain. For example, a user may have a friend that moved abroad. Using the social networking system, the user can find out what his friend has been doing and see his friend's photos the minute they are uploaded onto the social networking system.

A social networking system may store large amount of information that may be of interest to a user. This includes information describing other users that are connected to the user and user actions taken by different users. The social networking system may provide information describing these actions as notifications to the user. A user may be interested in some of these user actions but may not be interested in all the user actions available in the social networking system. To provide a good experience to users, the social networking system preferably sends notifications that are likely to be of interest to its users and does not send notifications that its users would find bothersome.

SUMMARY

Embodiments of the invention select notifications for sending to a user of a social networking system by filtering out the notifications in which the user is not likely to be interested. The social networking system sends notifications to a user describing user actions associated with a source entity, such as posts associated with a web page or a social group. The social networking system observes the interactions of the user with the notifications sent to the user. The social networking system then determines whether to send an option to opt out of notifications associated with the source entity based on the observations about the user's past interactions with notifications. For example, if the user does not interact with more than a threshold number of notifications associated with the source entity, or does not interact with notifications associated with the source entity for more than a threshold amount of time, the social networking system may present the user with the option to opt out of notifications associated with the source entity.

In an embodiment, the social networking system requests that the user provide reasons as to why the user opted out of notifications associated with the source entity. The social networking system may then provide the user's reasons for opting out to an entity associated with the source entity, for example, a system administrator of a web page or an administrator of a social group. The user's reasons may be aggregated with other users' reasons for opting out of receiving notifications from the same source entity. This feedback may allow the source entity to improve the posts associated with the entity, so as to make the notifications more interesting to other users of the social networking system.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment for Providing Notifications

A social networking system may send notifications to users, thereby providing information that is likely to be of interest to users. Notifications may provide information describing various actions taken by connections of a user. For example, a connection of a user may install an application using the social networking system, join a social group, create a connection with another user, like a photo, comment on a product, write on another user's wall, check-in to the social networking system from a particular location, update the user's status, and so on.

Figure 1:
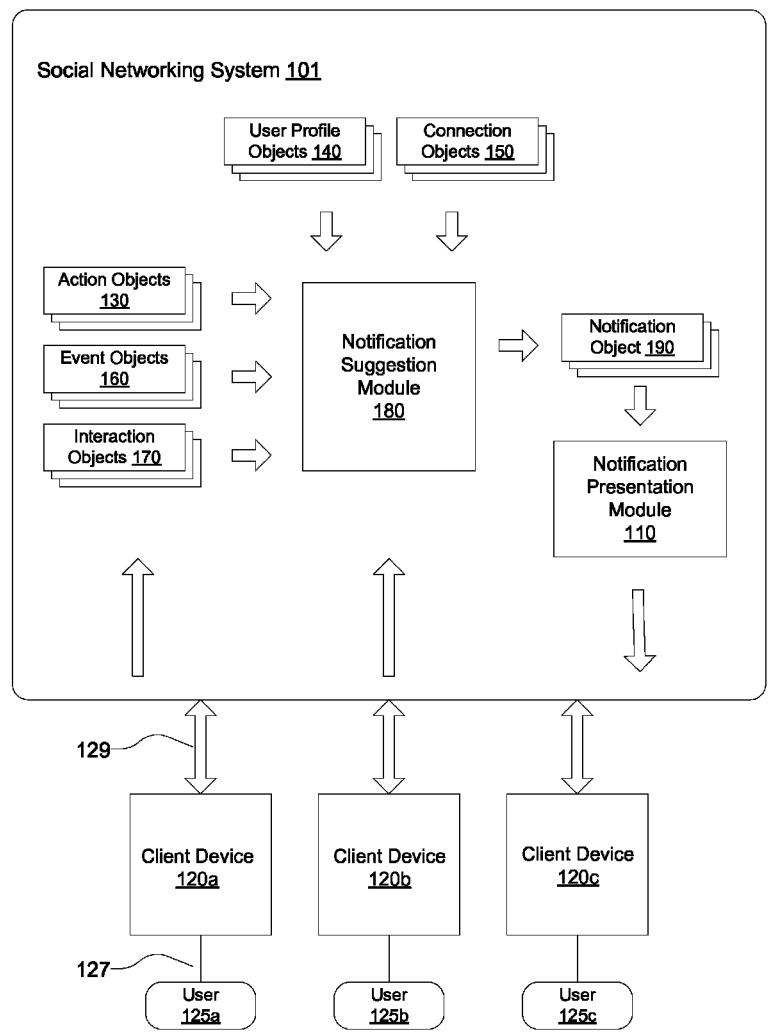
FIG. 1 is a diagram of a system environment for sending notifications to a user of a social networking system, in accordance with an embodiment of the invention.

FIG. 1 is a diagram of a system environment for selecting which notifications to send to a user of a social networking system, in accordance with an embodiment of the invention. The social networking system maintains several objects 140, 150 representing entities in the social networking system. The social networking system also maintains objects 130, 170 representing actions performed by users via the social networking systems. Several of these objects provide information that may be of interest to users. The notification suggestion module 180 analyzes information available in these objects to determine information that may be presented as notification to the users. The notification presentation module 110 sends the notifications for presentation to the user via the client device 120. The notification presentation module 110 may receive feedback from a user that can be used by the notification suggestion module 180 for selecting the notifications presented to each user.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g., "130" in the text refers to reference numerals "130A" and/or "130B" in the figures).

The users 125 interact with the social networking system 101 using client devices 120. Some embodiments of the system 101 have different and/or other modules than the ones described herein, and the functions may be distributed among the modules in a different manner than described here.

In one embodiment, the client device 120 used by a user 125 for interacting with the social networking system 101 may be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 120 may be any device having computer functionality, such as a personal digital assistant (PDA), mobile telephone, smart phone, etc.

In some embodiments, the client device 120 may use a web browser as an interface to interact with the social networking system. In other embodiments, specialized application software such as native applications on a mobile device may be used as an interface to interact with the social networking system.

The social networking system 101 offers its users the ability to communicate and interact with other users of the social networking system 101. Users join the social networking system 101 and then add connections to a number of other users of the social networking system 101 to whom they desire to be connected. As used herein, the term "friend" refers to any other user to whom a user has formed a connection, association, or relationship via the social networking system 101. The term friend need not require that users to actually be friends in real life, (which would generally be the case when one of the members is a business or other entity); it simply implies a connection in the social networking system 101.

The social networking system 101 maintains different types of objects representing entities, for example, user profile objects 140, connection objects 150, action object 130, event objects 160, interaction objects 170, and notification objects 190. An object may be stored for each instance of the associated entity. A user profile object 140 stores information describing a user of the social networking system 101. A connection object 150 stores information describing relations between two users of the social networking system or in general any two entities represented in the social networking system 101. An action object 130 stores information describing user action on and/or off the social networking system 101. An event object 160 stores representations of real-world events in the social networking system 101. An interaction object 170 stores information related to incoming and outgoing interaction between two accounts in the social networking system 101. A notification object 190 stores information about an activity that happened in the social networking system that may be of interest to the user 125.

These objects are further described in detail herein.

Figure 2:
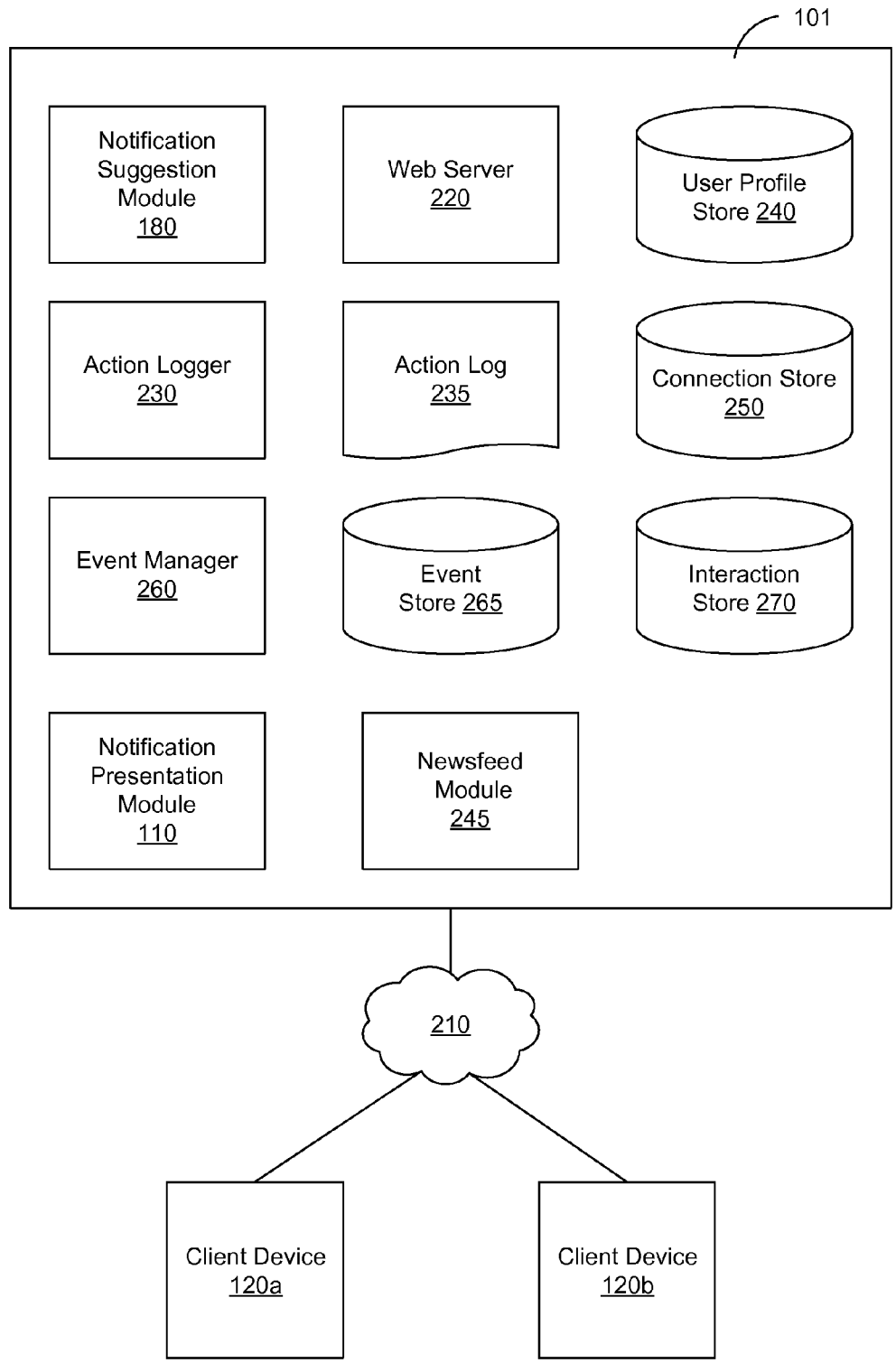
FIG. 2 is a diagram of the system architecture of a social networking system for sending notifications to a user of a social networking system, in accordance with an embodiment of the invention.

The social networking system 101 comprises modules other than those shown in FIG. 1, for example, modules illustrated in FIG. 2 that are further described herein.

Social Networking System Architecture

FIG. 2 is a diagram of system architecture of a social networking system 101 that selects which notifications to send to a user of a social networking system, in accordance with an embodiment of the invention. The social networking system 101 includes a web server 220, an action logger 230, an action log 235, an event manager 260, an event store 265, a user profile store 240, a connection store 250, an interaction store 270, a newsfeed module 245, a notification presentation module 110, and a notification suggestion module 180. In other embodiments, the social networking system 101 may include additional, fewer, or different modules for various applications. Conventional components such as network interfaces, security mechanisms, load balancers, failover servers, management and network operations consoles, and the like are not shown so as to not obscure the details of the system.

The social networking system 101 allows users to communicate or otherwise interact with each other and access content, as described herein. The social networking system 101 stores user profile objects 140 in the user profile store 240. The information stored in user profile store 240 describes the users of the social networking system 101, including biographic, demographic, and other types of descriptive information, such as work experience, educational history, gender, sexual preferences, hobbies or preferences, location, and the like. The user profile store 240 may also store information provided by the user, for example, images, videos, comments, and status updates. Images of users may be tagged with the identification information of the appropriate users displayed in an image.

Any action that a particular user takes using the social networking system 101 is associated with the user's profile 140, through information maintained in a database or other data repository. Such actions may include, for example, adding a connection to another user, sending a message to another user, reading a message from another user, viewing content associated with another user, attending an event posted by another user, among others. In addition, a number of actions described below in connection with other objects are directed at particular users, so these actions are associated with those users as well.

The connection store 250 stores data describing the connections between different users of the social networking system 101, for example as represented in a connection object 150. The connections are defined by users, allowing users to specify their relationships with other users. For example, the connections allow users to generate relationships with other users that parallel the users' real-life relationships, such as friends, co-workers, partners, and so forth. In some embodiments, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking site based on common characteristics of the users (e.g., users who are alumni of the same educational institution). For example, if Bob and Joe are both connected to each other in the social networking system 101, Bob and Joe, both users, are also each other's friends. The connection between users may be a direct connection; however, some embodiments of a social networking system 200 allow the connection to be indirect via one or more levels of connections.

Friends may also be suggested by other users of the social networking system, or by the social networking system itself. The social networking system may identify other users the user may know based on the social information available to the social networking system. For example, if another user has many friends in common with the user, it is highly likely they are members of the same friendship circle and therefore the social networking system may suggest this connection to both users.

The event store 265 stores information describing events associated with the social networking system 101, for example as represented in an event object 160. An event object 160 may be defined for a real-world event, such as a birthday party, a baby shower, and/or a high school reunion. A user interested in attending the event may establish a connection with the event object. A user may create the event object 160 by defining information about the event such as the time and place, a list of invitees, and the privacy of the event. Other users may send a reply to the invitation (an RSVP message) i.e., accept or reject the invitation, comment on the event, post their own content (e.g., pictures from the event), and perform any other actions enabled by the social networking system 101 for the event 160. Accordingly, the creator of the event object 160 as well as the invitees for the event may perform various actions that are associated with that event object 160. Furthermore, the event may be public, wherein any user of the social networking system is able to see details of the event and perform actions are associated with the event (e.g., comment on the event, post content, etc); friends only, wherein only the invitees and their friends can see the details of the event and perform actions are associated with the event; or invitees only, wherein only users invited to the event, either by the creator of the event or another invitee, can see the details of the event and perform actions are associated with the event.

Then interaction store 270 stores information describing interactions between two users of the social networking system 101, for example as represented in an interaction object 170. An interaction object 170 may be defined as a user liking another user; a user commenting on another user's profile, photo, video, or comment; a user creating a connection with another user; of a user sending a message to another user. An interaction may be further classified as an incoming interaction or an outgoing interaction as previously explained.

The web server 220 links the social networking system 101 via a network to one or more client devices 120; the web server 220 serves web pages, as well as other web-related content, such as Flash, XML, and so forth. The web server 220 provides the functionality of receiving and routing messages between the social networking system 101 and the client devices 220. These messages may be instant messages, queued messages (e.g., email), text and SMS (short message service) messages, or any other suitable messaging technique.

The interactions between the client devices 110 and the online system 100 are typically performed via a network 210, for example, via the internet. The network 210 enables communications between the client device 120 and the social networking system 101. In one embodiment, the network 210 uses standard communications technologies and/or protocols. Thus, the network 210 may include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 210 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 210 may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In another embodiment, the entities may use custom and/or dedicated data communications technologies instead of, or in addition to, the ones described above. Depending upon the embodiment, the network 210 may also include links to other networks such as the Internet.

The action logger 230 is capable of receiving communications from the web server 220 about user actions on and/or off the social networking system 101. The action logger 230 populates the action log 235 with information about user actions to track them. Any action that a particular user takes with respect to another user is associated with each user's profile, through information maintained in a database or other data repository, such as the action log 235. Such actions may include, for example, adding a connection to the other user, sending a message to the other user, reading a message from the other user, viewing content associated with the other user, attending an event posted by another user, among others. When a user takes an action on the social networking system 101, the action is recorded in an action log 235. In one embodiment, the social networking system 101 maintains the action log 235 as a database of entries.

The newsfeed module 245 identifies and presents newsfeed stories that provide social information to a user. However newsfeeds are delivered to a user based on a pull model. For example, information describing a story is presented to a user by the social networking system and the user pulls the story using a newsfeed user interface provided to the user by the social networking system. The newsfeed story may not even be generated until the user provides input indicating the user wants to pull the story. In contrast, a notification is delivered to a user based on a push model. The notifications are generated and stored for the user and may be pushed to a server for the user to view or even pushed to a device of the user. Since the notifications are delivered using the push model, the notification suggestion module 180 uses techniques disclosed herein to ensure that the user is highly likely to be interested in the notifications pushed to the user. Or else, notifications that are not of interest to the user may be generated and pushed to the user, thereby wasting resources of the social networking system as well as providing uninteresting information to the user.

The notification suggestion module 180 receives as an input actions, events and interactions that happened in the social networking system and generates a set of notifications to inform a user of such actions, events and interactions. The notification presentation module 110 sends the information used by a client device 120 to present notifications to the users and also request feedback from the user for use by the notification suggestion module 180. Details of the notification suggestion module 180 and the notification presentation module 110 are further described herein.

Notification Suggestion

The generation of notifications for users of a social networking system is performed by the notification suggestion module 180. In one embodiment, the notification suggestion module 180 takes as input actions, events, and/or interactions that occurred in the social networking system and generates the corresponding notifications to interested users.

Notifications inform users of the different actions that a user's connection has performed in the social networking system. In one embodiment, notifications are only generated for a user's friends' actions that are likely to be most relevant to the user. For example notifications may be generated for a user when one of the use's connection posts a comment mentioning the user, or when the user gets tagged in a photo. Notifications may be generated for actions that are likely to be of interest to the user as determined by past user actions. A user is likely to be interested in user actions related to a web page if the user is following the web page. Similarly, a user is likely to be interested in user actions related to a group if the user is a member of the group. As a result, notifications may be generated and sent to the user when a message is posted by a page the user is following, or when a different user posts a message in a group of which the user is a member.

Notifications generated by the notification suggestion module 180 may be delivered to the user in many different forms. Notifications may be posted in a special region of the social networking system user interface. For example, a special icon may be inserted in one of the corners of the web page used to interact with the social networking system that will change its shape or color when a new notification is generated. Notifications may also be delivered to a user via email or other types of messaging systems, such as the short messaging service (SMS), the multimedia messaging service (MMS), the enhance messaging service (EMS), and the like.

Notifications can increase the amount of time a user spends in the social networking system, but they can also enhance the user's experience in the social networking system. For example, some users only access the social networking system after receiving an email notification. But on the other hand, sending a large number of notifications to a user may provide poor user experience with the social networking system. Receiving too many notifications can make a user lose interest in reading the notifications provided by the social networking system altogether. Therefore, the notification suggestion module determines an appropriate amount of notifications so as to not miss any important notifications and not inundate the user with unimportant notifications.

Some embodiments of the notification suggestion module 180 use an opt-in schema, wherein the user has to explicitly inform the social networking system that he wants to get certain notifications. In this schema, all the notifications a user gets are very likely to be of interest to the user. The main drawback of this schema is that the user may miss certain actions for not being aware of them in the first place. The user may not be able to decide whether the user is interested in certain notifications until the user has seen those notifications.

Other embodiments of the notification suggestion module uses an opt-out schema, wherein the notification suggestion module generates notifications that may be of interest to a user and lets the user decide whether the user wants to keep getting those notifications or not. In one embodiment, the notification suggestion module presents a user interface that allows the user to provide explicit feedback indicating whether wants to keep receiving those notifications in the future. Another embodiment presents the above user interface at least a threshold number of times for a notification cluster so long as the user does not use the user interface to opt out of the notifications. After the threshold number of times, the notification suggestion module assumes the user wants to receive notifications of that particular type, for example, notifications from that user, notifications related to a thread of comments, notifications from a particular social group, and the like. Another embodiment does not explicitly ask the user if he wants to keep getting those notifications in the future, but allows other ways of opting-out, such as through an x-out button next to the notification that may be used by the user for indicating to the social networking system that the user does not want to receive related notifications. The mechanisms that allow a user to opt out of notifications of certain type have an advantage over the mechanisms that allow users to opt-in to notifications of certain type since the user has an opportunity to review the notifications before deciding whether the user wants to continue receiving the notifications. As a result, the user makes a more informed decision compared to deciding what notifications the user wants before having an opportunity to look at the notifications, for example, the opt-in mechanism.

A notification cluster refers to a group of notifications that share certain properties or characteristics. Typically, the notification cluster refers to notifications associated with a source entity represented in the social networking system. For example, the source entity may be another user, social group, page, a thread of comments, and/or the like and the notifications may be posts associated with the source entity. In an embodiment, the notification cluster may comprise notifications of a particular action type. A user notification cluster groups notification triggered by an action performed by one of the user's connection. A social group notification cluster groups notifications triggered by an action performed by any member of a group the user is a member of. A page notification cluster groups notifications triggered by an action performed by an administrator of a page the user is following or notifications describing comments by users added to the page, notifications describing actions of other users following the page, and so on. An action type notification cluster groups notifications triggered by a specific action, such the notifications triggered by the user being tagged to a photo, or notification triggered by the user being mentioned in a post.

Some embodiments do not require explicit opt-out from the user, but the notification suggestion module may infer if the user does not want to keep getting notifications from a notification cluster based on the user's behavior after getting notifications from the cluster. For example if a user does not read a notification for more than a threshold amount of time (e.g., 30 days), the notification suggestion module may determine that the user is not interested in that notification and may automatically stop generating notifications from that notification cluster. In one embodiment, the notification suggestion module informs the user about the automatic opt-out and provides a notification to allow the user to opt back in if case the user wants to continue receiving notifications from the opted-out notification cluster. In another embodiment, if user does not read a notification for more than a threshold amount of time, the suggestion module presents the user with a user interface that allows the user to opt out of similar notifications. In one embodiment, the notification suggestion module requires the user to ignore more than a threshold number of notifications from a cluster before suggesting the option to opt-out of the notifications from the associated source. In other embodiments, the notification suggestion module asks or informs the user that notifications form a cluster are not going to be presented before stopping the notification. Other criteria used to determine the interest of a user to a notification cluster include notification not being used for more than a threshold amount of time (i.e., the user has not clicked the notification) and aggregate click through rate (CRT) being below a threshold (i.e., the percentage of users using the notification or clicking the notifications is below a threshold).

After the notification suggestion module 180 receives an action, event, or interaction it decides based on the previously mentioned rules whether to generate a new notification and push the notification to the user. If a new notification is generated and pushed to the user, the notification suggestion module monitors the user's behavior associated with the newly generated notification and modifies the rules if needed. In some embodiments, if the notification suggestion module 180 determines that a notification is not needed, the notification suggestion module waits a pre-determined amount of time (e.g., 1 hour or 1 day) before taking further actions regarding that notification. After the waiting time expires, the notification suggestion module 180 bundles all the unsent notifications that did not required immediate notification and generates a single notification that includes all the notifications in the bundle. In other embodiments, if the notification suggestion module 180 determines that a notification is not needed for a certain action, the notification suggestion module 180 simply does not generate nor pushes any notification regarding the performed action.

Figure 3:
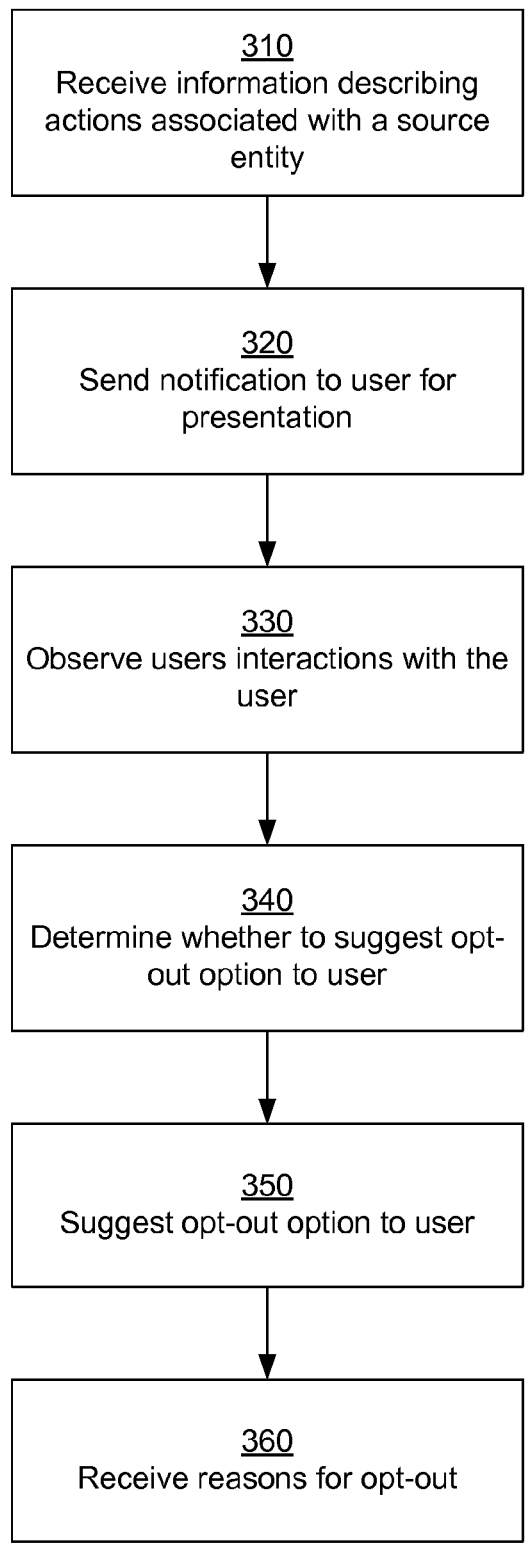
FIG. 3 is a flowchart of a process for sending notifications to a user of a social networking system, in accordance with one embodiment of the invention.

FIG. 3 shows the process of selecting notifications to be sent to a user of a social networking system. The notification suggestion module 180 first receives 310 information describing user actions associated with a source entity for a user, for example, notifications describing posts of users on a web page presented in the social networking system. The notification suggestion module 180 sends 320 notifications based on the user actions to the user. The notification suggestion module 180 observes the user's interactions with the notifications sent to the user, for example, whether the user interacts with the notifications. The notification suggestion module 180 determines 330 whether to suggest an option to opt-out from notifications from the user based on the observations. For example, if the user does not interact with the notifications for more than a threshold amount of time, the notification suggestion module 180 may suggest 350 the opt-out option to the user. If the user decides to opt out of notifications associated with the source entity, the notification suggestion module 180 reduces the rate at which notifications associated with the entity are sent to the user. For example, the notification suggestion module 180 may temporarily stop sending notifications associated with the source entity to the user. The notification suggestion module 180 may wait for a significant time interval before starting to send notifications associated with the entity to the user, for example, if the source entity has had a chance to make modifications that may improve the notifications and increase the chances of the user being interested in the notifications. The notification suggestion module 180 receives 360 feedback regarding the reasons as to why the user decided to opt out from the notifications. The notification suggestion module 180 may also receive 340 feedback from other users to determine, for example, aggregate information describing why users have opted out of notifications from the source entity. In an embodiment, if the user does not respond to the opt-out option, for example, by ignoring the opt-out option, the notification suggestion module 180 may automatically adjust the rate at which the notifications are sent to the user. For example, if the user has not clicked on the notifications for more than a threshold time interval or continues to ignore more than a threshold number of notifications associated with the source entity and still hasn't opted out of the notifications associated with the source entity, the notification suggestion module 180 may reduce the rate at which the notifications are sent to the user. For example, the notification suggestion module 180 may aggregate the notifications and send multiple notifications as a combined notification message.

The notification suggestion module 180 may provide information describing why the user decided to opt-out of notifications associated with the source entity to a user associated with the source entity. For example, if the user opts out of posts associated with a web page, the notification suggestion module 180 may provide reasons as to why users have opted out of the notifications to a system administrator of the web page. As another example, if the user opts out of posts associated with a social group, the notification suggestion module 180 may provide reasons as to why users have opted out of the notifications to a user administering the social group. The feedback allows the users associated with the source of the notifications to improve the posts so that users may be more interested in the notifications.

Figure 4:
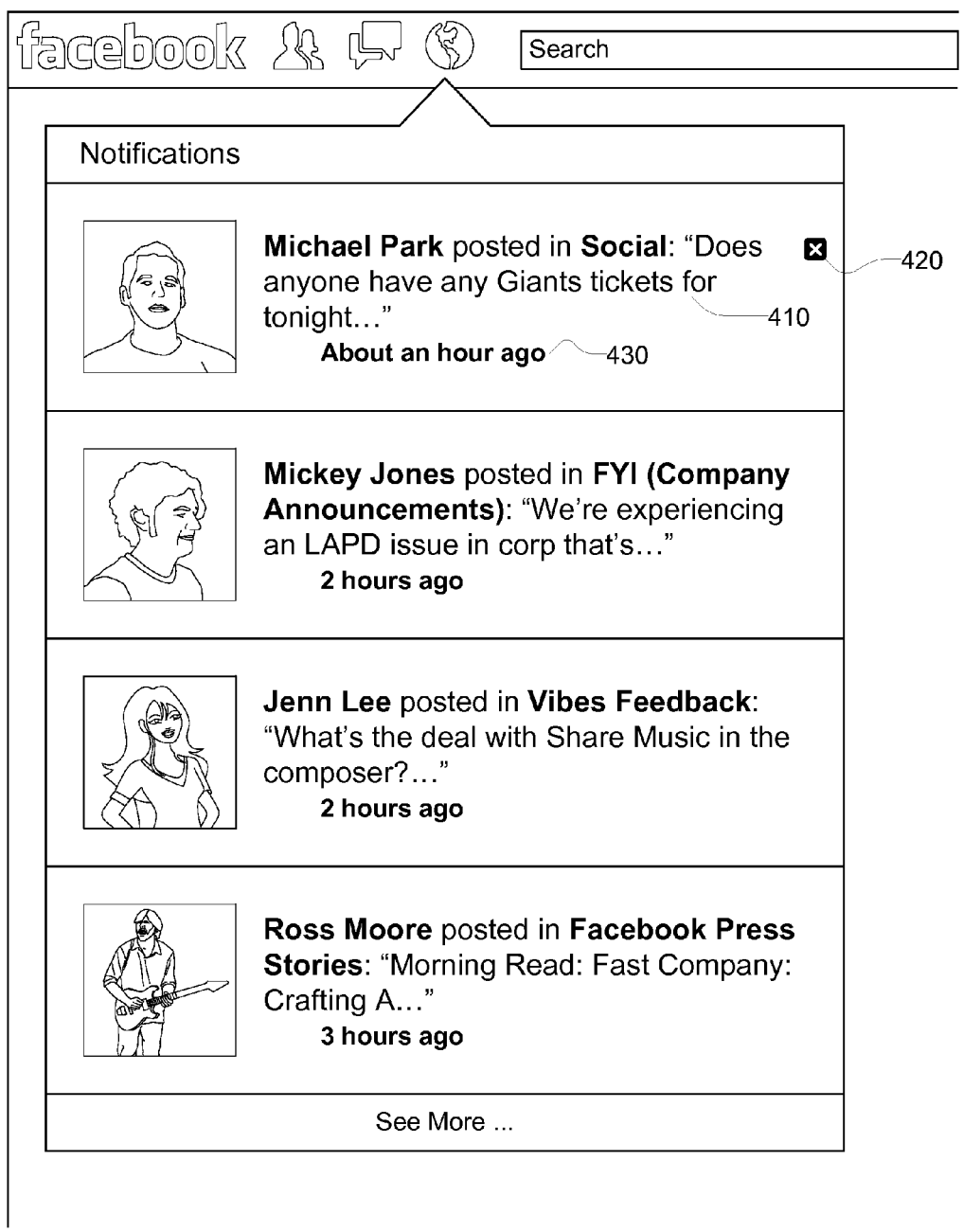
FIG. 4 shows a user interface for presenting notifications to a user of the social networking system, in accordance with an embodiment of the invention.

FIG. 4 shows a user interface for presenting notifications to a user of the social networking system, in accordance with an embodiment of the invention. Message 410 is the core of the notification and shows information describing the action that triggered the notification. The message 410 may contain information regarding the user that performed the action as well as a short description of the action. The user interface that shows an x-out 420 allows the user to hide the notification and opt-out from similar notifications. The timestamp 430 informs the user of the time the action was performed. In one embodiment, the notifications are sorted by timestamp, where the newest notification is displayed first and the oldest notification is displayed last.

Figure 5:
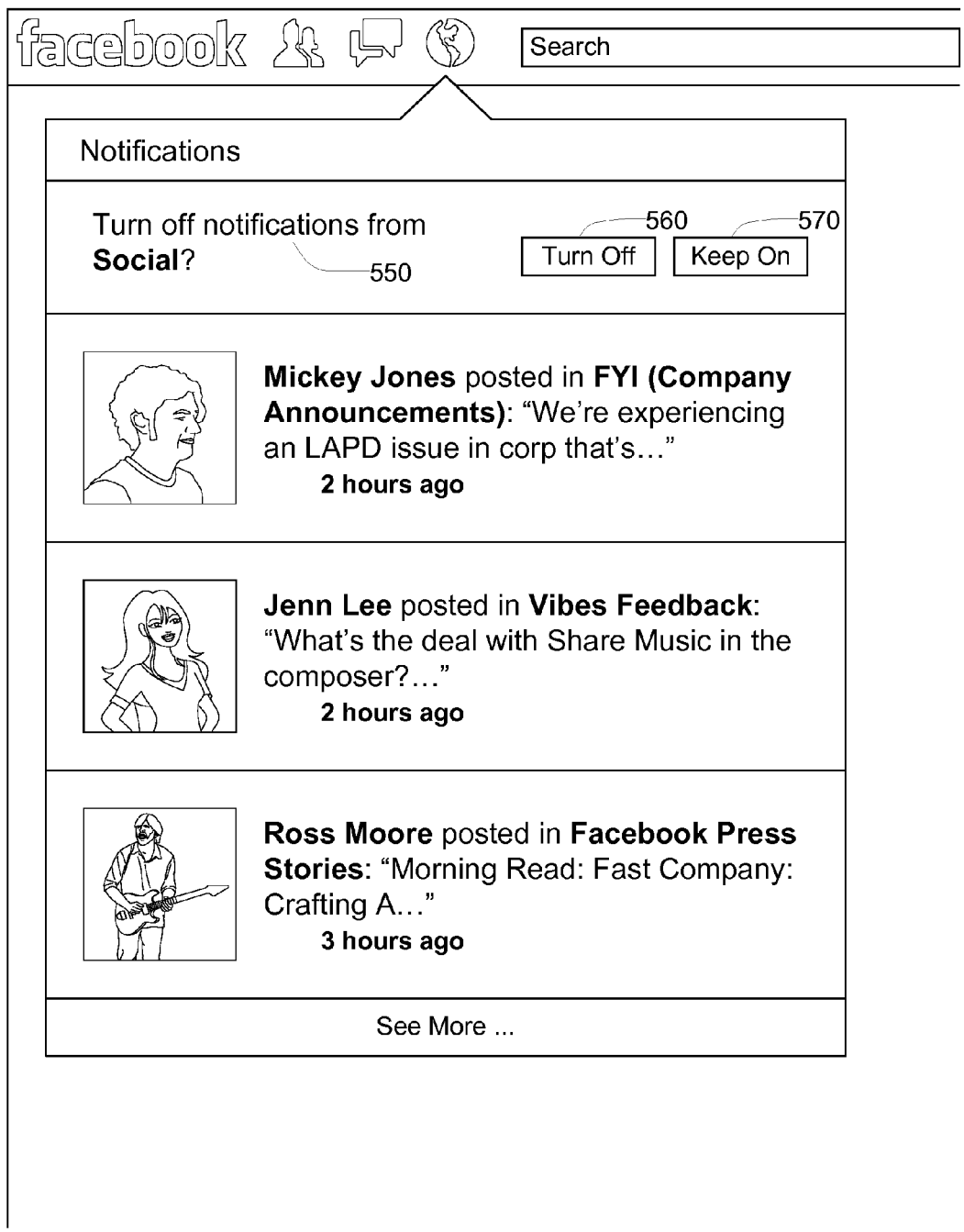
FIG. 5 shows a user interface that allows a user to opt out of certain types of notifications, in accordance with an embodiment of the invention.

FIG. 5 shows a user interface that allows a user to opt out of certain types of notifications, in accordance with an embodiment of the invention. If the user clicks on the x-out button 420, an opt-out message 550 is displayed. The opt-out message allows the user to turn off 560 all the notifications from the notification cluster or keep the notifications on 570. In one embodiment, if the user clicks on the turn off button 560, a confirmation message is displayed informing the user that the user is not going to get any notification from that cluster in the future. The confirmation message allows the user to revert the opt-out in case the user clicked the turn off button 560 by accident.

Suggesting Notifications of a Social Group

The social networking system may allow users of the social networking system to form a social group. Users may become members of the social group and may interact with the social group. For example, a member may post a message in the social group that may be accessible to all members of the social group but may not be accessible to users outside the social group, depending on the privacy settings of the social group.

In some embodiments, notifications from members of a social group are provided to other members of the social group. A social group may also be referred to as a group herein. The notification suggestion module 180 provides notifications to a member of the group based on actions performed in the group by other members of the group. For example when a member of the group posts a new message in the group, or uploads a new image into the group, other members may receive a notification informing them of the performed action. The default notification scheme is only suitable for small groups, but as the number of members in a group increases, the number of interactions inside the group also increases. This may result in an increase in the number of notifications a user gets regarding this group. After the number of members in a group has reached a certain limit, the default notification scheme may be changed to prevent a user from receiving too many notifications. In one embodiment, the notification suggestion module 180 changes its notification scheme after a group has reached a threshold number of members (for example, after a group has more than 250 members).

For groups with a large number of members, different criteria may be used to filter the notifications sent to a subject user. For example, in one embodiment, the notification suggestion module 180 may generate notifications only for actions performed by the user's connections and may ignore actions performed by other members that do not have a connection with the user. In another embodiment, the notification suggestion module 180 may generate notification for actions performed by members of that group that do not have a connection with the user and monitor the user's behavior after seeing the notification. If, for example, the user does not read a notification for more than a threshold amount of time (e.g., 30 days), then the notification suggestion module 180 may determine that the user is not interested in notification related to the user that triggered the notification and may automatically stop generating such notifications.

If a user is member of a group in which more than a threshold number of members have a connection with the user, the notification suggestion module may further filter out the notifications that are associated with members of the group that have a connection with the user. For instance, the notification suggestion module may filter out notifications associated with the user's connections based on an affinity between the user and the other members. The affinity between two users may be determined base on a rate of interactions between the two users. In one embodiment the user will only receive notifications from the top N friends, wherein "N" is a predetermined threshold number (such as N=100) and the friends are ranked based on their affinity with the user.

Notifications may also be filtered by seniority of a member in a group. For example, if a user is one of the first N members of a group (where N is a threshold number, such as 250), then the user will get notifications from all members of the group. If the user is not one of the first N members of the group, then the user will only get notifications from other users connected to the user.

Also, the notification suggestion module 180 may decide whether to generate a notification based on an affinity for the group of the user who performed the action that triggered the notification. The affinity for eth group may be determined based on an aggregate measure of the users interactions related to the group, including the frequency at which the user posts on the group, retrieves information related to the group, interacts with other members of the group, and so on. In one embodiment, if the user that triggered the generation of the notification has an affinity for the group that is higher than a threshold, every member of the group will receive a notification.

Notifications may also be filtered by the affinity for the group of the user receiving the notification. For example, a user with a high affinity for the group may receive notifications based on posts from all members, while a user with low affinity for the group may receive notifications based on posts from the user's connections in the social networking system.

The notification suggestion module 180 may determine whether to send a notification to a user based on the average frequency of user interactions inside the group. For example, a group where members do not post many messages may send notifications based on all posts by members to every other member. Also small groups (e.g., where the number of members is below the threshold) that have a large number of actions that trigger notifications may filter notifications based on various criteria discussed herein.

Figure 6:
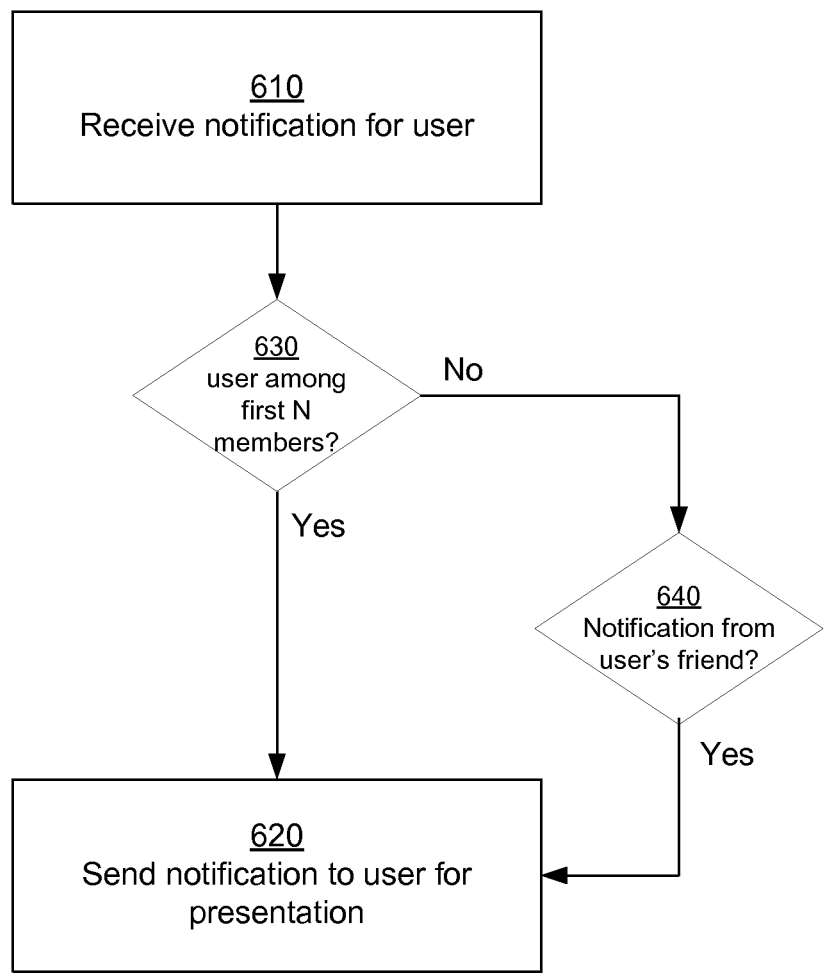
FIG. 6 shows the process of selecting notifications to be sent to a user that is a member of a group, in accordance with an embodiment of the invention.

FIG. 6 shows the process of selecting notifications to be sent to a user that is a member of a group. The notification suggestion module 180 first receives 610 a notification for a user. The notification suggestion module 180 determines 630 whether the user is among the first N members of the group. If the user is among the first N members of the group, then the notification suggestion module 180 automatically sends 620 the notification to the user. If the user is not among the first N members of the group, then the notification suggestion module 180 determines 640 if the notification was triggered by an action performed by a connection of the user. If the notification comes from a connection of the user, then the notification suggestion module 180 sends 620 the notification to the user. Otherwise, the notification is regarded as unimportant and is not sent to the user.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    sending, by a social networking system, notifications to a user, the notifications describing actions associated with a source entity represented in the social networking system;
    observing interactions of the user with the notifications sent to the user;
    determining whether to send a suggestion to the user to opt out of future notifications associated with the source entity based at least in part on whether the user has interacted with notifications associated with the source for longer than a threshold time period;
    sending the suggestion to the user to opt out of future notifications associated with the source entity based on the determining; and
    responsive to the user opting out of future notifications associated with the source entity, reducing a rate at which notifications associated with the source entity are sent to the user.

2. The computer implemented method of claim 1, further comprising:
    responsive to the user opting out of future notifications associated with the source entity, requesting the user to provide one or more reasons for opting out; and
    sending information describing the one or more reasons to another user associated with the source entity.

3. The computer implemented method of claim 2, wherein the information describing the reasons provided to the other user comprises aggregate information describing one or more reasons provided by a plurality of users.

4. The computer implemented method of claim 1, wherein the determining is based at least in part on whether the user has interacted with more than a threshold number of notifications associated with the source.

5. The computer implemented method of claim 1, wherein the determining is based at least in part on an aggregate click-through rate of a plurality of users for notifications associated with the source entity being below a threshold value.

6. The computer implemented method of claim 1, further comprising:
    responsive to the user not responding to the suggestion to opt out, determining whether to delay sending future notifications associated with the source entity by a predetermined time interval.

7. The computer implemented method of claim 1, further comprising:
    responsive to the user not responding to the suggestion to opt out, determining whether to aggregate multiple notifications associated with the source entity into a single notification.

8. The computer implemented method of claim 1, wherein the notifications are posts in the social networking system associated with the source entity.

9. The computer implemented method of claim 1, wherein the source entity is selected from a group consisting of: an application, a page associated with an entity, and another user of the social networking system.

10. The computer implemented method of claim 1, wherein reducing the rate at which messages are sent to the user comprises stopping all notifications associated with the source entity to the subject user.

11. A computer program product comprising a non-transitory computer-readable storage medium storing computer-executable instructions, the instructions when executed perform steps comprising:
    sending, by a social networking system, notifications to a user, the notifications describing actions associated with a source entity represented in the social networking system;
    observing interactions of the user with the notifications sent to the user;
    determining whether to send a suggestion to the user to opt out of future notifications associated with the source entity based at least in part on whether the user has interacted with more than a threshold number of notifications associated with the source;
    sending the suggestion to the user to opt out of future notifications associated with the source entity based on the determining; and
    responsive to the user opting out of future notifications associated with the source entity, reducing a rate at which notifications associated with the source entity are sent to the user.

12. The computer program product of claim 11, further comprising:
    responsive to the user opting out of future notifications associated with the source entity, requesting the user to provide one or more reasons for opting out; and
    sending information describing the one or more reasons to another user associated with the source entity.

13. The computer program product of claim 12, wherein the information describing the reasons provided to the other user comprises aggregate information describing one or more reasons provided by a plurality of users.

14. The computer program product of claim 11, wherein the determining is based at least in part on whether the user has interacted with notifications associated with the source for longer than a threshold time period.

15. The computer program product of claim 11, wherein the determining is based at least in part on an aggregate click-through rate of a plurality of users for notifications associated with the source entity being below a threshold value.

16. The computer program product of claim 11, further comprising:
    responsive to the user not responding to the suggestion to opt out, determining whether to delay sending future notifications associated with the source entity by a predetermined time interval.

17. The computer program product of claim 11, further comprising:
    responsive to the user not responding to the suggestion to opt out, determining whether to aggregate multiple notifications associated with the source entity into a single notification.

18. The computer program product of claim 11, wherein the notifications are posts in the social networking system associated with the source entity.

19. The computer program product of claim 11, wherein the source entity is selected from a group consisting of: an application, a page associated with an entity, and another user of the social networking system.

20. The computer program product of claim 11, wherein reducing the rate at which messages are sent to the user comprises stopping all notifications associated with the source entity to the subject user.

21. A computer implemented method comprising:
    sending, by a social networking system, notifications to a user, the notifications describing actions associated with a source entity represented in the social networking system;
    observing interactions of the user with the notifications sent to the user;
    determining whether to opt out a user of future notifications associated with the source entity based at least in part on an aggregate click-through rate of a plurality of users for notifications associated with the source entity being below a threshold value; and
    responsive to the determination, reducing a rate at which notifications associated with the source entity are sent to the user.

22. The computer implemented method of claim 21, further comprising:
    informing the user of the reduction in the rate at which notifications associated with the source entity are sent to the user; and
    providing an interface to revert the reduction in the rate at which notifications associated with the source entity are sent to the user.

23. The computer implemented method of claim 21, wherein reducing the rate at which messages are sent to the user comprises stopping all notifications associated with the source entity to the subject user.

24. The computer implemented method of claim 21, wherein the determining is based at least in part on whether the user has interacted with notifications associated with the source for longer than a threshold time period.

25. The computer implemented method of claim 21, wherein the determining is based at least in part on whether the user has interacted with more than a threshold number of notifications associated with the source.

* * * * *